United States Patent Office 3,094,538
Patented June 18, 1963

3,094,538
CARBONATOPROPYL DICARBAMATES
John C. Smith, Lake Jackson, Tex., assignor to The Dow Chemical Company, Midland, Mich., a corporation of Delaware
No Drawing. Filed May 21, 1958, Ser. No. 736,710
3 Claims. (Cl. 260—340.2)

This invention relates to dicarbamate esters of 2,3-carbonatopropanol. Such esters may be represented by the formula

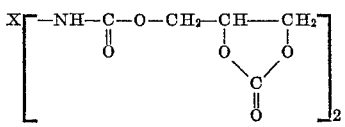

wherein X is the divalent hydrocarbon residue of a diisocyanate.

The esters of the invention are useful as chemical intermediates. Thus, they are useful in the preparation of hydroxyurethane resins as disclosed in my copending application with Arthur E. Gurgiolo and Wilbur L. Bressler, Serial No. 693,515, filed October 31, 1957. Another preferred utility consists of reacting the compounds with two molecular equivalents of a monoamine wherein the amino nitrogen atom bears at least one hydrogen atom, whereby the corresponding bis(hydroxyaminocarbamates) are formed. The latter contain at least two alcoholic hydroxyl groups and may also contain reactive N–H groups through which they may be resinified through reaction with diisocyanates, dicarboxylic acids or other difunctional compounds that are reactive toward active hydrogen. If the amine thus used for reaction with the dicarbonatocarbamates of the present invention are mono- or dialkanolamines, the compounds thus produced contain, respectively 4 or 6 hydroxyl groups and thus are even more reactive in the formation of urethane or alkyd resins and the like.

The compounds of the invention are conveniently prepared by the reaction of an organic diisocyanate with 2,3-carbonatopropanol:

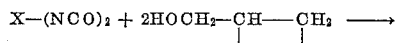

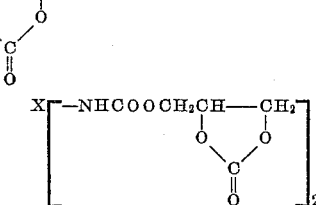

Substantially any organic diisocyanate may be used in the above reaction. Thus, for example, I may use an aromatic diisocyanate, such as phenylenediisocyanate, tolylenediisocyanate, the halophenylenediisocyanates, the alkylidenebis(phenylisocyanates) or an aliphatic diisocyanate, such as ethylenediisocyanate, hexamethylenediisocyanate, 1,2-octylenediisocyanate, $\alpha,\alpha'$-xylylene diisocyanate, cyclohexenediisocyanate, 1,12-diisocyanatooctadecane, and the like.

The reaction between the diisocyanate and the carbonatopropanol is easily carried out by gradually mixing the two reactants, suitably, dissolved in an inert solvent, at a temperature of about 20–100° C. The reaction may be accelerated by the addition of a catalytic amount of a tertiary amine, such as triethylamine or pyridine.

An alternative method for making the compounds of the invention comprises treating a di-primary-amine, such as phenylenediamine or ethylenediamine, with at least two molar equivalents of phosgene, thus forming the corresponding dicarbamyl chloride. The latter may then be reacted with 2,3-carbonatopropanol to form the desired product.

The production of the carbamates of the invention is illustrated by the following examples.

EXAMPLE I

*Preparation of Bis(2,3-Carbonatopropyl) 4-Methyl-1,3-Benzene-Dicarbamate*

87.0 gm. (0.50 mole) of freshly distilled 2,4-tolylenediisocyanate, 100 ml. of dry dioxane and 1 ml. of triethylamine were placed in a 500 ml. flask and agitated. To this was added dropwise 118.0 gm. (1.0 mole) of dry 2,3-carbonatopropanol. The reaction was exothermic so the rate of addition was such that the temperature of the reaction mixture was maintained between 60 and 70° C.

Upon completion of the reaction, the dioxane solvent was removed by distillation to a pot temperature of 140° C. at 22 mm. of Hg. The product remaining in the flask was a yellow glass-like solid with a melting point of 59–69° C.

EXAMPLE II

*Preparation of Bis(2,3-Carbonatopropyl) Hexamethylenedicarbamate*

In a 500 ml. three-neck flask were placed 52.0 gm. (0.31 mole) of hexamethylenediisocyanate and 90 ml. of freshly distilled dioxane. The flask was fitted with a condenser, stirrer and dropping funnel. In the dropping funnel was placed 73.2 gm. (0.62 mole) of 2,3-carbonatopropanol. The carbonatopropanol was added to the solution at a rate of about 1 drop per 2 seconds. After several minutes, 0.5 ml. of triethylamine was added through the condenser. The solution became warm to the touch. After the addition was complete, the last traces were rinsed in with 10 ml. of dioxane. The resulting solution was heated to 75° C., then allowed to cool. This resulted in the formation of a solid cake of white crystals. These were separated, dissolved in 250 ml. of ethyl alcohol and allowed to crystallize. The crystals were filtered and dried, 66 g., M.P., 121–124° C. A second crop was obtained from the filtrate, 30 g., M.P., 102–110° C. Total yield, 96 g., or 76 percent of theoretical.

Other carbonatopropyl dicarbamates are obtained by substantially the methods described above except that other diisocyanates are used instead of those shown in the examples.

The use of the compounds of the present invention in making polyhydroxyurethane resins is illustrated by the following experiment. One-fourth mole of the product of Example 1 was dissolved in dioxane. To this solution was added 0.5 mole of propylenediamine. The mixture was maintained at 60–70° C. for 30 minutes, after which the solvent was removed, thus leaving a hard, brittle solid. A mixture of this solid and tolylene diisocyanate, when heated and stirred, reacted to form a hard, tough, resinous product.

I claim:
1. A compound having the formula

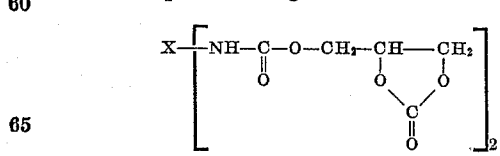

wherein X is the divalent hydrocarbon residue of a diisocyanate selected from the group consisting of phenylene, $\alpha,\alpha'$-xylylene, 2,4-tolylene, halophenylene, ethylene, hexamethylene, 1,2-octylene and 1,12-octadecylene diisocyanates.

2. A compound as defined in claim 1 wherein X is a 2,4-tolylene radical.

3. A compound as defined in claim 1 wherein X is a hexamethylene radical.

References Cited in the file of this patent

UNITED STATES PATENTS 2,967,173   Fang _____ Jan. 3, 1961

FOREIGN PATENTS 109,064   Sweden _____ Nov. 16, 1943

OTHER REFERENCES

Migrdichian: The Chemistry of Organic Cyanogen Compounds, pp. 382–384 (1947).